United States Patent
Yoon et al.

(10) Patent No.: US 9,720,375 B2
(45) Date of Patent: Aug. 1, 2017

(54) SPATIAL LIGHT MODULATING PANEL USING TRANSMITTIVE LIQUID CRYSTAL DISPLAY PANEL AND 3D DISPLAY DEVICE USING THE SAME

(71) Applicant: LG DISPLAY CO., LTD., Seoul (KR)

(72) Inventors: Minsung Yoon, Paju-si (KR); Sunwoo Kim, Anyang-si (KR); Minyoung Shin, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 565 days.

(21) Appl. No.: 13/679,634

(22) Filed: Nov. 16, 2012

(65) Prior Publication Data

US 2013/0120817 A1 May 16, 2013

(30) Foreign Application Priority Data

Nov. 16, 2011 (KR) ........................ 10-2011-0119727

(51) Int. Cl.
*G03H 1/22* (2006.01)
*G02F 1/13* (2006.01)
(Continued)

(52) U.S. Cl.
CPC ......... *G03H 1/2294* (2013.01); *G02F 1/1313* (2013.01); *G02F 1/1393* (2013.01); *G02B 6/001* (2013.01); *G02B 27/0093* (2013.01); *G02F 2203/50* (2013.01); *G03H 2001/0858* (2013.01); *G03H 2225/32* (2013.01); *G03H 2225/60* (2013.01); *G03H 2225/61* (2013.01)

(58) Field of Classification Search
CPC .. G03H 1/0443; G03H 1/2294; G03H 1/0866; G03H 2210/30; G03H 2001/005; G03H 1/08; G03H 1/2286; G03H 2223/14; G03H 2001/0447; G03H 1/0808; G03H 1/268; G03H 2001/0088; G03H 2001/0216; G03H 2001/0858; G03H 2225/32; G03H 2225/60; G03H 2225/61; G02F 1/1313; G02F 1/1393; G02F 2203/50

See application file for complete search history.

(56) References Cited

U.S. PATENT DOCUMENTS 5,119,214 A * 6/1992 Nishii et al. ...................... 359/7
5,416,618 A    5/1995 Juday
(Continued)

FOREIGN PATENT DOCUMENTS

DE   WO2010149588   *  6/2010   ............... G03H 1/26
JP        8-190095 A      7/1996
(Continued)

*Primary Examiner* — Stephone B Allen
*Assistant Examiner* — Jyotsna Dabbi
(74) *Attorney, Agent, or Firm* — Birch, Stewart, Kolasch & Birch, LLP

(57) ABSTRACT

A spatial light modulating panel using a transitive liquid crystal display panel and a three-dimensional display device using the same. A a spatial light modulator including a plurality of pixels arrayed in a matrix manner; and a liquid crystal layer configured to modulate phase of an incident light passing through the each pixel, respectively. The spatial light modulator and the 3D display using the same provides a thin flat type display system having an easy and simple structure and a low manufacturing cost.

8 Claims, 5 Drawing Sheets

(51) Int. Cl.
*G02F 1/139* (2006.01)
*G02B 27/00* (2006.01)
*F21V 8/00* (2006.01)
*G03H 1/08* (2006.01)

(56) References Cited

U.S. PATENT DOCUMENTS

| | | | |
|---|---|---|---|
| 5,796,378 | A * | 8/1998 | Yoshida et al. .................. 345/88 |
| 6,396,463 | B1 * | 5/2002 | Tomono ................... G02B 5/32 345/32 |
| 2008/0198431 | A1 * | 8/2008 | Schwerdtner ........ G02B 5/1876 359/32 |
| 2010/0067077 | A1 * | 3/2010 | Kroll .................... G03H 1/2205 359/22 |
| 2010/0149617 | A1 * | 6/2010 | Kroll ................. G02F 1/133632 359/249 |
| 2010/0195178 | A1 | 8/2010 | Leister et al. |
| 2012/0092735 | A1 * | 4/2012 | Futterer ................... G02B 5/32 359/11 |

FOREIGN PATENT DOCUMENTS

| | | |
|---|---|---|
| KR | 10-2010-0038101 A | 4/2010 |
| WO | WO 2010/149588 A1 | 12/2010 |

\* cited by examiner

V = 0, Δø = 0

$V \neq 0, \Delta\varnothing \neq 0$ $V = V_{max}, \Delta\varnothing = 2\pi$

SPATIAL LIGHT MODULATING PANEL USING TRANSMITTIVE LIQUID CRYSTAL DISPLAY PANEL AND 3D DISPLAY DEVICE USING THE SAME

This application claims the benefit of Korean Patent Application No. 10-2011-0119727 filed on Nov. 16, 2011, which is incorporated herein by reference for all purposes as if fully set forth herein.

BACKGROUND OF THE INVENTION

Field of the Invention

The present disclosure relates to a spatial light modulating panel using a transitive liquid crystal display panel and a three-dimensional (or 3D) display device using the same. Especially, the present disclosure relates to a spatial light modulating panel using a transitive liquid crystal display panel applied to the holography type 3D display and a 3D display device using the same.

Discussion of the Related Art

Recently, many technologies and researches for making and reproducing the 3D (Three Dimensional) image/video are actively developed. As the media relating to the 3D image/video is a new concept media for virtual reality, it can improve the visual information better, and it will lead the next generation display devices. The conventional 2D image system merely suggests the image and video data projected to plan view, but the 3D image system can provide the full real image data to the viewer. So, the 3D image/video technologies are the True North image/video technologies.

Typically there are three methods for reproducing 3D image/video; the stereoscopy method, the auto-stereoscopy method, the volumetric method, the holography method and the integral imaging method. Among them, the holography method uses laser beam so that it is possible to observe the 3D image/video with naked eyes. The holography method is the most ideal method because it has an excellent visual stereoscopic property without any fatigue of observer.

To produce a recording of the phase of the light wave at each point in an image, holography uses a reference beam which is combined with the light from the scene or object (the object beam). If these two beams are coherent, optical interference between the reference beam and the object beam, due to the superposition of the light waves, produces a series of intensity fringes that can be recorded on standard photographic film. These fringes form a type of diffraction grating on the film, which is called the hologram. The central goal of holography is that when the recorded grating is later illuminated by a substitute reference beam, the original object beam is reconstructed (or reproduced), producing a 3D image/video.

There was a new development of the computer generated holography (or CGH) that is the method of digitally generating holographic interference patterns. A holographic image can be generated e.g. by digitally computing a holographic interference pattern and printing it onto a mask or film for subsequent illumination by suitable coherent light source. the holographic image can be brought to life by a holographic 3D display, bypassing the need of having to fabricate a "hardcopy" of the holographic interference pattern each time.

Computer generated holograms have the advantage that the objects which one wants to show do not have to possess any physical reality at all. If holographic data of existing objects is generated optically, but digitally recorded and processed, and brought to display subsequently, this is termed CGH as well. For example, a holographic interference pattern is generated by a computer system and it is sent to a spatial light modulator such as LCSML (Liquid Crystal Spatial Light Modulator), then the 3D image/video corresponding to the holographic interference pattern is reconstructed/reproduced by radiating a reference beam to the spatial light modulator. FIG. 1 is the structural drawing illustrating the digital holography image/video display device using the computer generated holography according to the related art.

Referring to FIG. 1, the computer 10 generates a holographic interference pattern of an image/video data to be displayed. The generated holographic interference pattern is sent to a SLM 20. The SLM 20, as a transmittive liquid crystal display device, can represent the holographic interference pattern. At one side of the SLM 20, a laser source 30 for generating a reference beam is located. In order to radiate the reference beam 90 from the laser source 30 onto the whole surface of the SLM 20, an expander 40 and a lens system 50 can be disposed, sequentially. The reference beam 90 out from the laser source 30 is radiated to one side of the SLM 20 passing through the expander 40 and the lens system 50. As the SLM 20 is a transmittive liquid crystal display device, a 3D image/video corresponding to the holography interference pattern will be reconstructed/reproduced at the other side of the SLM 20.

The holography type 3D display system according to the FIG. 1 comprises a light source 30 for generating the reference light 90, an expander 40 and a lens system 50 which have relatively large volume. In case that this kind 3D display system is configured, it may have large volume and huge weight. That is, the conventional arts for the holography type 3D display system are not adequate to apply to the thin, light and portable display systems which are recently required. Therefore, it is required to develop a thin flat type holography 3D display system which can represent the real 3D images with the naked eyes.

For prior art, there is one of the holography type 3D display using the thin flat panel. For example, according to U.S. Pat. No. 5,416,618, the holography type 3D display device using two liquid crystal display panels is disclosed. In U.S. Pat. No. 5,416,618, the one SLM for modulating the phase of the light and the other SLM for modulating the amplitude of the light are used. As combining two SLM, the system would be thicker and expensive than the system using one SLM. Furthermore, it is hard to align these two SLMs and the method for driving two SLM in combination may be very complicated.

SUMMARY OF THE INVENTION

In order to overcome the above mentioned drawbacks, the purpose of the present disclosure is to suggest a spatial light modulator (or SLM) using a liquid crystal panel applied to a thin flat panel type holography 3D display and a 3D display using the same SLM. Another purpose of the present disclosure is to suggest a spatial light modulator for thin flat panel type holography 3D display using a liquid crystal panel for controlling the phase and amplitude of the light by modulating the phase of the one back light in different ways at each pixel and by complex modulating them.

In order to accomplish the above purpose, the present disclosure suggests a spatial light modulating panel comprising: a plurality of pixels arrayed in a matrix manner; and a liquid crystal layer configured to modulate phase of an incident light passing through the each pixel, respectively.

The device further comprises an upper substrate and a lower substrate defining the pixels arrayed in the matrix manner and joining each other with the liquid crystal layer therebetween; an upper electrode disposed at each pixel and formed an inner side of the upper substrate; and a lower electrode disposed at each pixel and formed an inner side of the lower substrate.

The liquid crystal layer includes an ECB mode liquid crystal material having a thickness for changing the phase of the incident light passing the each pixel from 0 to $2\pi$ according to the birefringence of the liquid crystal layer.

The incident light is linearly polarized parallel to an initial alignment direction of the liquid crystal layer and propagated to the pixels in a collimated condition.

Furthermore, the present disclosure suggests a holography 3D display comprising: a back light unit providing a linearly polarized back light to one direction; and a spatial light modulating panel disposed at the one direction, including a plurality of pixels arrayed in a matrix manner for phase-modulating of the back light, respectively, and configured to combine the phase-modulated back light after passing through two neighbored pixels.

The spatial light modulator further comprises: an upper substrate and a lower substrate defining the pixels arrayed in the matrix manner and joining each other; a liquid crystal layer disposed between the upper substrate and the lower substrate; an upper electrode disposed at each pixel and formed an inner side of the upper substrate; and a lower electrode disposed at each pixel and formed an inner side of the lower substrate.

The liquid crystal layer includes an ECB mode liquid crystal material having a thickness for changing the phase of the back light passing the each pixel from 0 to $2\pi$ according to the birefringence of the liquid crystal layer.

The back light is linearly polarized parallel to an initial alignment direction of the liquid crystal layer and propagated to the pixels in a collimated condition from the back light unit.

The spatial light modulator and the 3D display using the same according to the present disclosure, after conducting the phase modulation of the back light at two neighboring pixels, respectively, by complex combining these two modulated lights, makes the holography 3D images in the space between the SLM and the observer. Therefore, with only one transitive liquid crystal panel, the holography 3D images/video can be reproduced, represented or reconstructed. Furthermore, only by the phase modulation, the amplitude and the phase of the light can be modulated at the same time so the holography 3D images can be reproduced. Therefore, the controlling method and the system configuration for holography 3D images/videos are simple. The spatial light modulator and the 3D display using the same according to the present disclosure provides thin flat type display system having the easy and simple structure and the low manufacturing cost.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
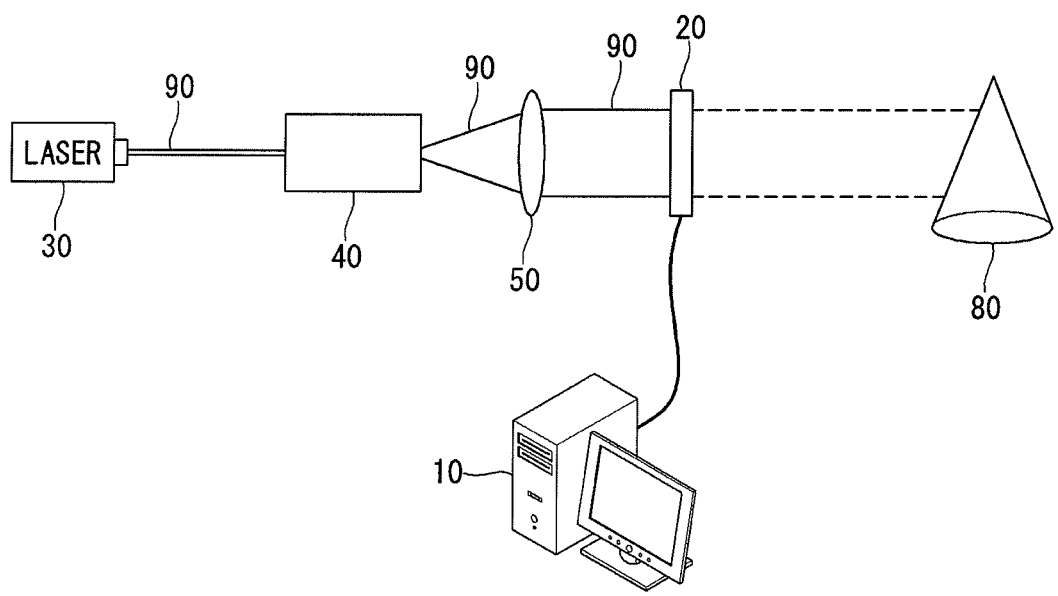
FIG. 1 is the structural drawing illustrating the digital holography image/video display device using the computer generated holography according to the related art.

Referring to attached figures, we will explain preferred embodiments of the present disclosure. Like reference numerals designate like elements throughout the detailed description. However, the present disclosure is not restricted by these embodiments but can be applied to various changes or modifications without changing the technical spirit. In the following embodiments, the names of the elements are selected by considering the easiness for explanation so that they may be different from actual names.

Figure 2:
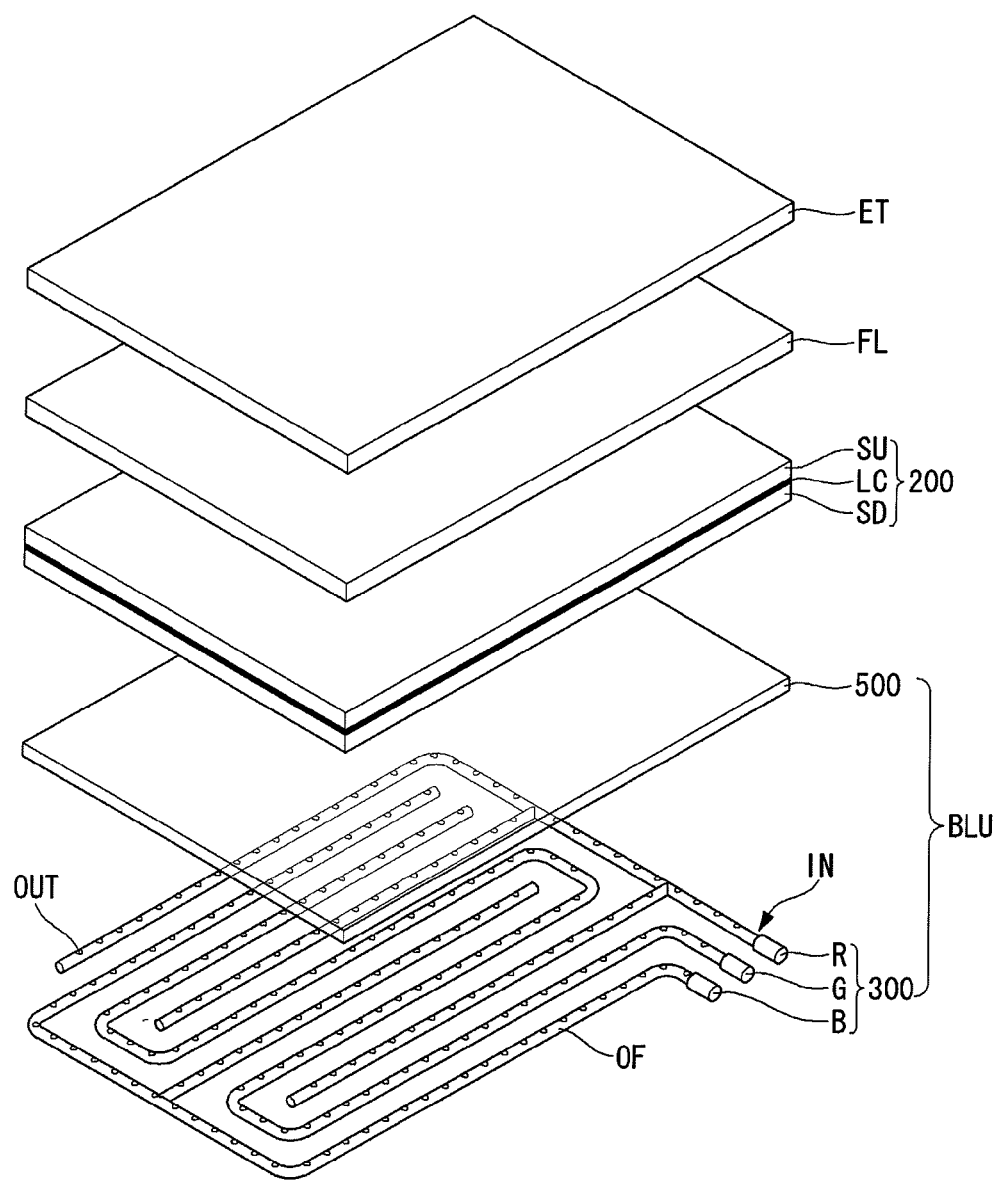
FIG. 2 is a schematic view illustrating the structure of the digital holography 3D display system using a transitive liquid crystal display device according to the present disclosure.

Referring to FIG. 2, we will explain a thin flat type holography 3D display device using a transmittive liquid crystal display used as the space light modulator according to the present disclosure. FIG. 2 is a structural drawing illustrating the digital holography image/video display device using a transmittive liquid crystal display device according to the present disclosure.

The holography 3D display device according to the present disclosure comprises a SLM 200 made of the transmittive liquid crystal display panel. The SLM 200 comprises a upper substrate SU and a lower substrate SD which are made of transparent glass substrate and faced each other, and a liquid crystal layer LC sandwiched between the upper substrate SU and the lower substrate SD. The SLM 200 may represent the interference fringe patterns by receiving the data relating to the interference fringe patterns from a computer or video processor (not shown in figures). The upper substrate SU and the lower substrate SD may have the thin film transistors and the color filters for comprising the liquid crystal display panel, respectively.

At the rear side of the SLM 200, a back light unit BLU comprising a light source 300 and a optical fiber OF may be disposed. The light source 300 may be a set of laser diodes including a red laser diode R, a green laser diode G and a blue laser diode B, or a set of collimated LED including a red LED, a green LED and a blue LED. In addition, the light source 300 may include other color light source than red, green and blue color light sources. Otherwise, the light source 300 may have one source like a white laser diode or a white collimated LED. There may be many kinds of the light source 300. In these embodiments, the light source 300 is explained as comprising the red, green and blue laser diodes, in convenient.

In order to guide a reference light from the light source 300 to the SLM 200 and in order to distribute the reference light over the whole area of the rear surface of the SLM 200, it is preferable to use optical fibers OF. For example, red, green and blue laser diodes R, G and B are disposed at one side of the back light unit BLU. Using the optical fibers OF, the laser beam irradiated from the laser diodes R, G and B can be guided as it reaches to the rear surface of the SLM 200. The optical fiber OF may be disposed as covering the whole surface of the SLM 200, the liquid crystal display. Especially, by removing some portions of the clad wrapping the core of the optical fiber OF in order to form a plurality of light points OUT, the laser beam may be irradiated over the whole surface of the liquid crystal display panel, SLM 200. Furthermore, in order to radiate the reference light expanded and irradiated by the optical fiber OF over whole surface of the SLM 200 evenly and to be a collimated light, a plurality of optical sheets 500 may be disposed between the SLM 200 and the optical fiber OF.

In this embodiment, the back light unit BLU is one exemplary schematic structure using the optical fiber OF. In the case that the color pixels comprising the SLM 200 are disposed as one kind color is arrayed along the column, one optical fiber OF corresponding to one kind of color may be disposed as matching to the same color column. For another example, the back light unit BLU may comprise a surface emitting LED disposed at each color pixel. As the main concept of the present disclosure is not on the back light unit BLU, the detailed explanations for the back light unit BLU will not be mentioned.

In front of the SLM 200, at a proper position in the space between the observer and the SLM 200, a flat lens FL may be further included for focusing the 3D images. The focal point of the flat lens FL may be set in various. For example, the focal point may be set on an optimized position between the SLM 100 and the observer. For another example, the focal point may be set on the eye of the observer directly. In this case, the left-eye image and the right-eye image are sent to the left eye and the right eye, respectively. As the main feature of the present disclosure is not on the flat lens FL, the detailed explanation for the flat lens will not be mentioned.

Furthermore, an eye-tracker ET may be included in front of the flat lens FL. When the observer's position is changed, the eye-tracker ET may detect the changed observer's position, calculates the optimized viewing angle for the moved observer, and then deflects the focal point of the 3D images according to the new optimized viewing angle of the observer. For example, the eye-tracker ET may be a deflector for moving the focal point of the 3D images in horizontal direction according to the observer's position. Even though not showing in figures, the eye-tracker ET may further comprise a position detector for detecting the observer's position. As the main feature of the present disclosure is not on the eye-tracker ET, the detailed explanation for the flat lens will not be mentioned.

Figure 3:
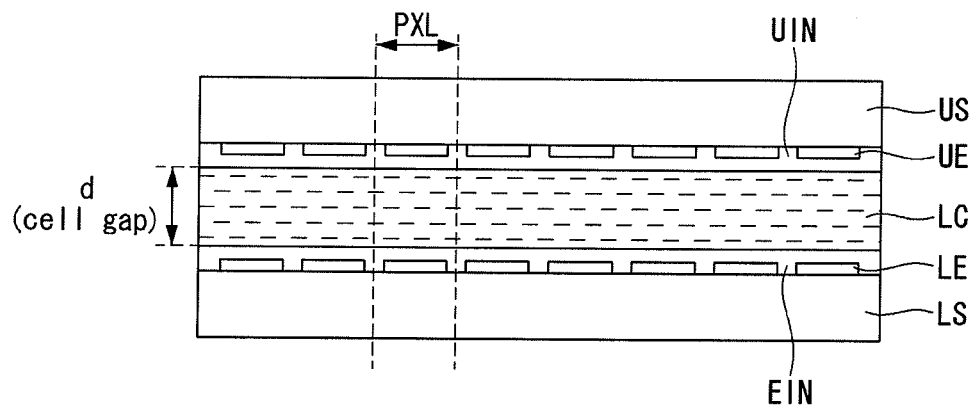
FIG. 3 is a cross sectional view illustrating the structure of the spatial light modulator according to the present disclosure.

Hereinafter, we will explain about the spatial light modulator 200, one of the key elements of the present disclosure, in detail. FIG. 3 is a cross sectional view illustrating the structure of the spatial light modulator according to the present disclosure.

The spatial light modulator 200 according to the present disclosure comprises a plurality of pixels PXL arrayed in a matrix manner. The spatial light modulator 200 according to the present disclosure further comprises an upper substrate US and a lower substrate LS joined each other and a liquid crystal layer EC disposed therebetween. Inner side of the upper substrate US, a plurality of upper electrodes UE allocated at each pixels PXL is disposed in the matrix array. Inner side of the lower substrate LS, a plurality of the lower electrodes LE is disposed in the matrix array.

The liquid crystal layer EC may preferably include ECB (Electrically Controlled Birefringence) mode liquid crystal material. Especially, it is more preferable that the liquid crystal layer EC including ECB mode LC material would be controlled as the phase of the light passing through this liquid crystal layer EC can be modulated from 0 to $2\pi$. The phase modulation can be decided by the multiplication of the birefringence, $\Delta n$, of the liquid crystal material and the thickness (or the cell gap) of the liquid crystal layer, d. That is, $\Delta\Phi = \Delta n \times d$.

In some cases, an upper insulating layer UIN covering the upper electrodes UE may be further included. In this case, the upper insulating layer UIN may be used as the alignment layer deciding the initial alignment direction of the liquid crystal layer EC. Also, a lower insulating layer LIN covering the lower electrodes LE may be included. In that case, the lower insulating layer LIN may also be used as the alignment layer deciding the initial alignment direction of the liquid crystal layer EC.

Figure 4A:
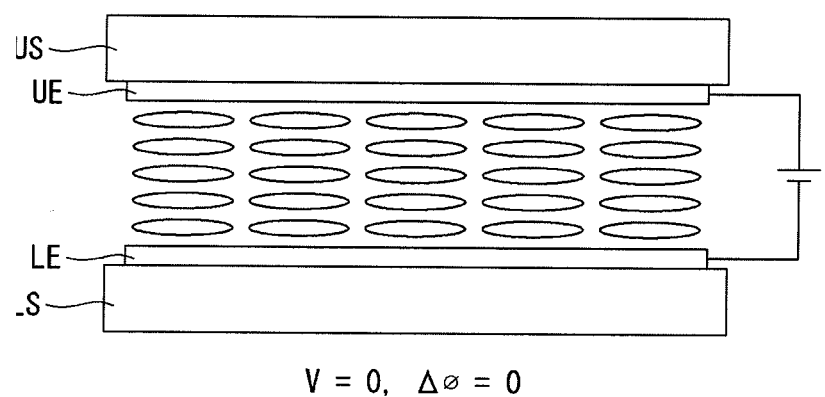
FIGS. 4A to 4C are cross sectional views illustrating one pixel of the spatial light modulator according to the present disclosure for showing the changes of the liquid crystal molecules according to the voltage differences applied to the liquid crystal layer and the changes in the phase ($\Phi$) of the light passing the liquid crystal molecules.
Figure 4B:
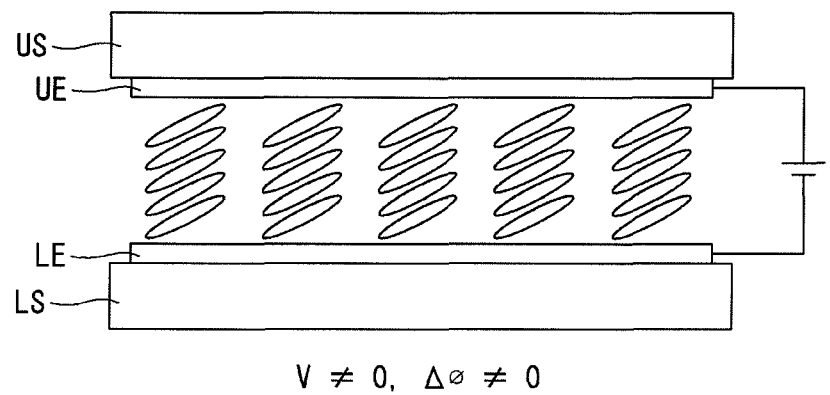
Figure 4C:
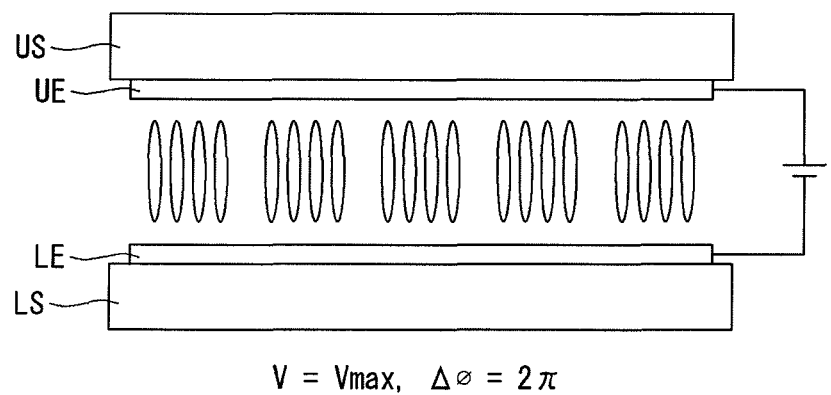

Making the voltage differences between the upper electrode UE and the lower electrode LE, if an electric field is formed between them, then the alignment direction of the liquid crystal molecules of the liquid crystal layer EC may be change. FIGS. 4A to 4C are cross sectional views illustrating one pixel of the spatial light modulator according to the present disclosure for showing the changes of the liquid crystal molecules according to the voltage differences applied to the liquid crystal layer and the changes in the phase ($\Phi$) of the light passing the liquid crystal molecules.

The ECB mode liquid crystal material can show the birefringence according to the tilting angle of the liquid crystal molecules controlled by the applied voltage differences. That is the birefringence (i.e. optical anisotropy or refraction index anisotropy), $\Delta n$, can be represented as the following Equation 1.

$$\Delta n = n_{eff} - n_o \qquad \text{[Equation 1]}$$
$$= \frac{n_e n_o}{\sqrt{n_o^2 \sin^2\theta + n_e^2 \cos^2\theta}} - n_o$$

Here, '$\theta$' is the tilting angle of the liquid crystal molecules to the horizontal direction, '$n_o$' is the refraction index of the liquid crystal molecules at the short axis, '$n_e$' is the refraction index of the liquid crystal molecules at the long axis, and '$n_{eff}$' is the refraction index of the liquid crystal molecules at the tilted angle.

FIG. 4A shows the condition in which there is no electric field between the upper electrode UE and the lower electrode LE. When any electric field is applied to the liquid crystal layer EC (V=0), the liquid crystal molecules hold the position according to the initial alignment direction. At the initial alignment direction, $\theta = 0$ so that, the incident light from the lower substrate LS is propagating along to the short axis of the liquid crystal molecules. That is, '$n_{eff}$' is equal to '$n_o$'. That is, the birefringence $\Delta n = n_o - n_o = 0$. Therefore, there is no change in the phase of the light passing through the liquid crystal layer EC ($\Delta\Phi = 0$).

FIG. 4B shows the case in which any one voltage selected between the minimum voltage (V=0) and the maximum voltage (Vmax). When certain voltage Va, any one value between the minimum voltage (V=0) and the maximum voltage (Vmax), is applied to the liquid crystal layer EC (V=Va), the liquid crystal molecules may be tilted with the angle of $\theta a$ ($\theta = \theta a$). Therefore, $\Delta n$ is changed to have not zero value. According to the multiplication of Δn and the thickness of the liquid crystal layer EC, d, the phase of the light passing through the liquid crystal molecules can be changed (Δφ=φa≠0).

FIG. 4C shows the condition in which the maximum voltage difference (Vmax) is applied between the upper electrode UE and the lower electrode LE. When the maximum electric field is applied to the liquid crystal layer EC, all liquid crystal molecules are aligned along to the direction of the electric field. That is, liquid crystal molecules are vertically rearranged, θ=90°. At this time, Δn may have the maximum difference value in refraction index of the liquid crystal material, $\Delta n=n_e-n_o$. In the present disclosure, the phase difference (phase retardation) according to the liquid crystal layer EC is set as having the maximum value. That is, the cell gap, d, of the liquid crystal layer EC is decided as the phase retardation, $\Delta\Phi=2\pi\times\Delta n\times d/\lambda$, has the maximum value, $2\pi$, according to the maximum birefringence $\Delta n(n_e-n_o)$. Therefore, the phase difference of the light after passing the liquid crystal layer EC will be $2\pi$ (Δφ=2π).

Figure 5:
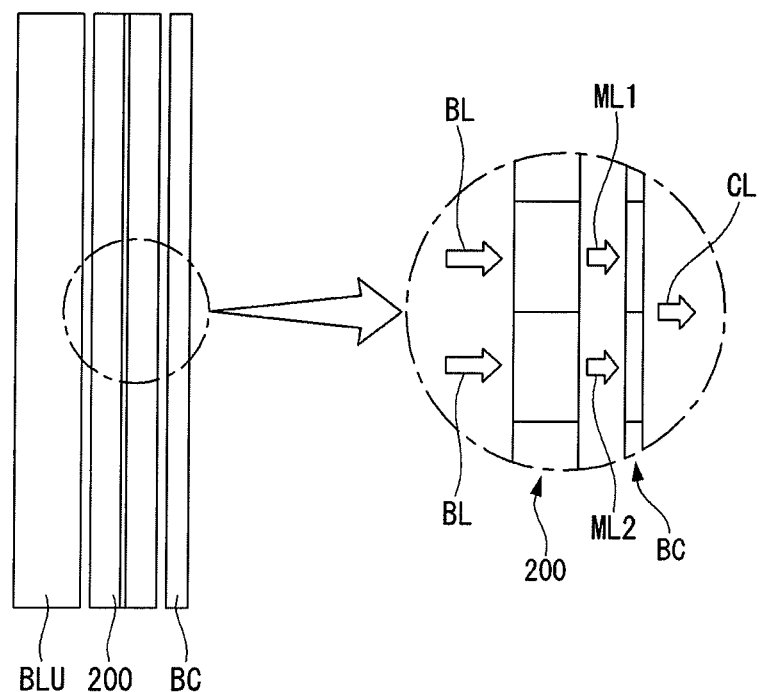
FIG. 5 is a cross sectional view illustrating the structure of the digital holography 3D image/video display device having the transitive liquid crystal panel according to the second embodiment of the present disclosure.

Hereinafter, we will explain about the spatial light modulator generating the diffracted light corresponding to the holography images using a transitive liquid crystal panel having the liquid crystal layer designed as to have the phase differences (or retardations) from 0 to $2\pi$, in detail. FIG. 5 is a cross sectional view illustrating the structure of the digital holography 3D image/video display device having the transitive liquid crystal panel according to the second embodiment of the present disclosure. FIG. 5 includes partially enlarged view showing two neighbored pixels and illustrates the structure and the operating principle of the spatial light modulator according to the present disclosure.

The spatial light modulating panel according to the present disclosure, like the liquid crystal display panel, comprises a plurality of pixels arrayed in a matrix manner. With two neighboring pixels as a basic unit, the phase of the back light passing first pixel and the phase of the back light passing second pixel neighboring the first pixel are modulated, respectively, in different manners. These neighboring two lights after modulating differently are combined to accomplish the complex amplitude modulation.

Referring to FIG. 5, the holography 3D display system according to the present disclosure comprises a flat type back light unit BLU and the spatial light modulator 200 according to the present disclosure. As the back light BL from the back light unit BLU is passing through the spatial light modulator 200, the phases of the back light BL from a plurality of the pixels are changed differently each other, and then the lights from two neighboring pixels are combined to represent the holography images.

Here, it is preferable that the back light BL is linearly polarized and propagated to the spatial light modulator 200 as a collimated light. To do this, it is possible to reproduce the holography image correctly more and more, by combining the two light of which phases are modulated after passing through the spatial light modulator 200. Furthermore, the initial alignment direction of the molecules of the liquid crystal layer EC is preferably parallel to the linear polarization direction of the back light BL. To do that, the transmissivity of the back light BL passing through the liquid crystal layer EC can be maintained uniformly.

In detail, the back light BL radiated from the back light unit BLU, as a linearly polarized light, has the amplitude of A and the phase of φ0. This back light passes through two neighboring pixels, respectively included in the spatial modulator 200. At this time, as the first voltage difference V1 is applied to the left pixel L, the light passing through the liquid crystal layer EC of the left pixel L can be modulated to have the phase of φ1. At the same time, on the other hand, as the second voltage difference V2 is applied to the right pixel R, the light passing through the liquid crystal layer EC of the right pixel R can be modulated to have the phase of φ2. As the spatial light modulator 200 is the phase-only modulation liquid crystal panel, the amplitude of the back light is not modulated, just passing through the pixels. As a result, the back light BL passing through the left pixel L may be a first modulated light ML1 having the amplitude of A and the phase of φ1. Also, the back light BL passing through the right pixel R may be a second modulated light ML2 having the amplitude of A and the phase of φ2. As the first modulated light ML1 and the second modulated light ML2 are very closely emitted from the spatial light modulator 200, they are interfered each other so that a combined light CL may be generated.

Here, the wave equation of the combined light CL may satisfy the following Equation 2.

$$Ae^{i\phi_1} + Ae^{i\phi_2} = 2A\cos\frac{(\phi_1-\phi_2)}{2}e^{i\frac{(\phi_1+\phi_2)}{2}} \qquad \text{[Equation 2]}$$

Here, A means the amplitude of the back light, φ1 means the phase of the first modulated light, and φ2 means the phase of the second modulated light.

According to the Equation 2, the combined light CL has the amplitude of 2A cos[(φ1−φ2)/2] and the phase of $e^{i(\phi 1+\phi 2)/2}$. That is, just by modulating the phase of the incident lights and combining these phase-only modulated lights, it is possible to get a combined light having the modulated amplitude and the modulated phase. In other words, by complex combining two lights which are conducted the phase only modulation by two neighboring pixels it is possible to control the amplitude and the phase of the light at the same time and to regenerate the holography 3D images/videos.

In order to effectively conduct the complex combination of the two neighboring lights modulated their phases by the neighboring two pixels, a light combining panel BC may be further disposed in front of the spatial light modulator 200. Even though it is not shown in figures, using a flat lens having focus to combining two phase modulated lights radiated from the neighboring two pixels of the spatial light modulator 200, the combined light CL can be generated at any point in the space between the spatial light modulator and the observer.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A spatial light modulating panel device comprising:
a plurality of pixels arrayed in a matrix;
a liquid crystal layer including an electrically controlled birefringence (ECB) mode liquid crystal material and having a constant thickness corresponding to a cell gap;
an upper substrate and a lower substrate defining the pixels arrayed in the matrix and joining each other with the liquid crystal layer therebetween;
an upper electrode disposed at each pixel and formed on an inner side of the upper substrate; and
a lower electrode disposed at each pixel and formed on an inner side of the lower substrate,
wherein the liquid crystal layer is electrically controlled to modulate a phase of an incident light passing through each pixel from 0 to $2\pi$ by controlling only a birefringence of the ECB mode liquid crystal material,
wherein two neighboring pixels form a basic unit configured to interfere and produce a three-dimensional (3D) holographic image with phase and amplitude variation, the basic unit producing two phase only modulated lights having different phases, and
wherein a flat lens panel disposed in front of the upper electrode focuses and combines the two phase only modulated lights output by the two neighboring pixels to provide a combined light having a modulated amplitude and a modulated phase.

2. The spatial light modulating panel device according to claim 1, wherein the incident light is linearly polarized parallel to an initial alignment direction of the liquid crystal layer and propagated to the pixels in a collimated condition.

3. The spatial light modulating panel device according to claim 1, further comprising:
an eye tracking layer disposed on the upper substrate,
wherein the eye tracking layer is configured to:
  detect a changed observer's position;
  calculate an optimized viewing angle for the changed observer's position; and
  deflect a focal point of the 3D holographic image according to the optimized viewing angle, and
wherein the flat lens panel is disposed between the eye tracking layer and the spatial light modulating panel within the spatial light modulating panel device.

4. The spatial light modulating panel device according to claim 1, wherein the two neighboring pixels within the basic unit modulate the phase of the incident light differently.

5. A holography 3D (three-dimensional) display comprising:
a back light unit providing a linearly polarized back light to one direction;
a spatial light modulating panel disposed at the one direction, and including a plurality of pixels arrayed in a matrix for phase-modulating of the back light, respectively;
an upper substrate and a lower substrate defining the pixels arrayed in the matrix;
a liquid crystal layer including an electrically controlled birefringence (ECB) mode liquid crystal material and having a constant thickness corresponding to a cell gap, the liquid crystal layer being disposed between the upper substrate and the lower substrate,
wherein the liquid crystal layer is electrically controlled to modulate a phase of the back light passing through each pixel from 0 to $2\pi$ by controlling only a birefringence of the ECB mode liquid crystal material;
a flat lens panel disposed at the one direction;
an upper electrode disposed at each pixel and formed on an inner side of the upper substrate; and
a lower electrode disposed at each pixel and formed on an inner side of the lower substrate,
wherein two neighboring pixels form a basic unit configured to interfere and produce a 3D holographic image with phase and amplitude variation, the basic unit producing two phase only modulated lights having different phases,
wherein the flat lens panel disposed in front of the upper electrode focuses and combines the two phase only modulated lights output by the two neighboring pixels to provide a combined light having a modulated amplitude and a modulated phase, and
wherein the spatial light modulating panel is disposed between the flat lens panel and the back light unit within the holography 3D display.

6. The holography 3D display according to claim 5, wherein the back light is linearly polarized parallel to an initial alignment direction of the liquid crystal layer and propagated to the pixels in a collimated condition from the back light unit.

7. The holography 3D display according to claim 5, further comprising:
an eye tracking layer disposed on the upper substrate,
wherein the eye tracking layer is configured to:
  detect a changed observer's position;
  calculate an optimized viewing angle for the changed observer's position; and
  deflect a focal point of the 3D holographic image according to the optimized viewing angle, and
wherein the flat lens panel is disposed between the eye tracking layer and the spatial light modulating panel within the holography 3D display.

8. The holography 3D display according to claim 5, wherein the two neighboring pixels within the basic unit modulate the phase of the phase-modulated back light differently.

* * * * *